(12) United States Patent
Didier et al.

(10) Patent No.: US 9,830,442 B2
(45) Date of Patent: Nov. 28, 2017

(54) METHOD FOR GENERATING AT LEAST ONE DERIVED IDENTITY

(71) Applicant: MORPHO, Issy-les-Moulineaux (FR)

(72) Inventors: Bernard Didier, Issy-les-Moulineaux (FR); Herve Chabanne, Issy-les-Moulineaux (FR); Julien Bringer, Issy-les-Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 71 days.

(21) Appl. No.: 14/888,015

(22) PCT Filed: Apr. 23, 2014

(86) PCT No.: PCT/EP2014/058284
§ 371 (c)(1),
(2) Date: Oct. 29, 2015

(87) PCT Pub. No.: WO2014/177444
PCT Pub. Date: Nov. 6, 2014

(65) Prior Publication Data
US 2016/0103986 A1   Apr. 14, 2016

(30) Foreign Application Priority Data
Apr. 30, 2013  (FR) .................................. 13 54006

(51) Int. Cl.
*G06Q 20/40*  (2012.01)
*H04L 9/08*  (2006.01)
(Continued)

(52) U.S. Cl.
CPC .............. *G06F 21/32* (2013.01); *G06F 21/34* (2013.01); *G06Q 20/40145* (2013.01);
(Continued)

(58) Field of Classification Search
CPC ............ G06F 21/32; G06F 21/34; G06F 7/10; G06Q 20/40145; H04L 9/085; H04L 9/3231
(Continued)

(56) References Cited

U.S. PATENT DOCUMENTS 7,178,025 B2 * 2/2007 Scheidt .................... G06F 21/31
                                                                  705/67
9,407,637 B2 * 8/2016 Patey ..................... H04L 9/0866
(Continued)

FOREIGN PATENT DOCUMENTS

WO    WO 03/065169 A2    8/2003
WO    WO 2010/099473 A1  9/2010

OTHER PUBLICATIONS

S. Omar et al., "Multi-Purpose Student Card System Using Smart Card Technology," Information Technology Based Higher Education and Training, 2004, ITHE T 2004, Proceedings of the Fifth International Conference on Instanbul, Turkey, May 31-Jun. 2, 2004, Piscataway, NJ, USA, IEEE, May 31, 2004, pp. 527-532, XP010741746, DOI: 10.1109/ITHET.2004.1358229 ISBN: 978-0-7803-8596-2 paragraph [00IV].
(Continued)

*Primary Examiner* — Kambiz Zand
*Assistant Examiner* — Benjamin Kaplan
(74) *Attorney, Agent, or Firm* — Muncy, Geissler, Olds & Lowe, P.C.

(57) ABSTRACT

The invention provides a method of generating at least one derived identity of an individual 1, the method comprising the following steps:
  generating a first identifier id1 from biometric data of the individual;
  defining a serial number ns associated with the individual;
  generating first check data ctrl1 for verifying consistency between the first identifier id1 and the serial number ns; and (Continued)

concatenating the serial number ns, the first identifier id1, and the first check data ctrl1 in such a manner as to form a first derived identity ident1 of the individual.

14 Claims, 2 Drawing Sheets

(51) Int. Cl.
  *H04L 9/32* (2006.01)
  *G06F 21/32* (2013.01)
  *G06F 21/34* (2013.01)
  *G07F 7/10* (2006.01)
(52) U.S. Cl.
  CPC ............. *G07F 7/10* (2013.01); *H04L 9/085* (2013.01); *H04L 9/3231* (2013.01)
(58) Field of Classification Search
  USPC .......................................................... 726/7
  See application file for complete search history.

(56) References Cited

U.S. PATENT DOCUMENTS

| | | | |
|---|---|---|---|
| 2006/0167784 A1* | 7/2006 | Hoffberg | G06Q 20/401 705/37 |
| 2008/0092240 A1* | 4/2008 | Sitrick | G06F 21/10 726/27 |
| 2009/0254971 A1* | 10/2009 | Herz | G06Q 10/10 726/1 |

OTHER PUBLICATIONS

S. Maryam et al., "Combining Encryption Methods in Multipurpose Smart Card," Cyber Security, Cyber Warfare and Digital Forensic (CYBERSEC), 2012 International Conference on, IEEE, Jun. 26, 2012, pp. 43-48, XP032207597, DOI: 10.1109/CYBERSEC.2012. 6246120 ISBNn: 978-1-4673-1425-1 paragraph [0III].

* cited by examiner

METHOD FOR GENERATING AT LEAST ONE DERIVED IDENTITY

BACKGROUND OF THE INVENTION

Nowadays each individual is in possession of a certain number of a wide variety of "cards", e.g. an identity card, a bank card, a Social Security card, etc., all of which may be characterized firstly by a function they perform, and secondly by means they use to recognize the individual. Thus, traditional identity cards enable individuals to prove their identities during checks, providing third parties making the checks recognize the individuals from photographs on the cards. Likewise, bank cards enable individuals to make purchases, providing the individuals are in a position to provide respective confidential codes associated with each bank card.

Proposals have also been made to replace conventional recognition means with biometric recognition means. A card is then provided with a chip containing previously acquired biometric data of the individual, which data is representative of a physical characteristic of that individual (fingerprints, retina or iris of an eye, etc.). When an individual presents such a card, the individual is recognized by acquiring that individual's biometric data once more and then comparing the acquired data with the data in the card. For example, a French biometric passport stores data representative of two fingerprints of an individual.

The advantage of biometric data in terms of recognition reliability and personal security is undeniable.

Proposals have also been made to use the biometric data present in a single card to perform a variety of functions or to access a variety of services. It is thus possible to envisage biometric data stored in an identity card enabling an individual to access various different public services, such as Social Security, tax authorities, etc. Once more, the advantage in terms of reliability of authentication and of simplifying the management of identification means cannot be disputed. Nevertheless, such an identity card would then constitute a unique identity vector giving access to that individual's data as associated with the use of a variety of different services, which can lead to problems relating to protecting people's personal data.

It would thus be particularly advantageous to succeed in using the biometric data for recognizing an individual in a manner that facilitates that individual gaining access to a service, while ensuring that it is not possible to identify the individual in question from data stored by the service supplier.

OBJECT OF THE INVENTION

An object of the invention is to respond to the above-raised problems.

SUMMARY OF THE INVENTION

In order to achieve this object, the invention provides a method of generating at least one derived identity of an individual, the method comprising the following steps:
  generating a first identifier from biometric data of the individual;
  defining a serial number associated with the individual;
  generating first check data for verifying consistency between the first identifier and the serial number; and
  concatenating the serial number, the first identifier, and the first check data in such a manner as to form a first derived identity of the individual.

The derived identity of the individual as formed in this way may be associated by a service supplier with personal data of that individual. The service supplier can thus access the individual's personal data without storing the identity of that individual, and without being able to access that individual's biometric data.

The invention can be better understood in the light of the following description of a particular, non-limiting implementation of the invention.

BRIEF DESCRIPTION OF THE DRAWINGS

Reference is made to the accompanying drawings, in which.

DETAILED DESCRIPTION OF THE INVENTION

Figure 1:
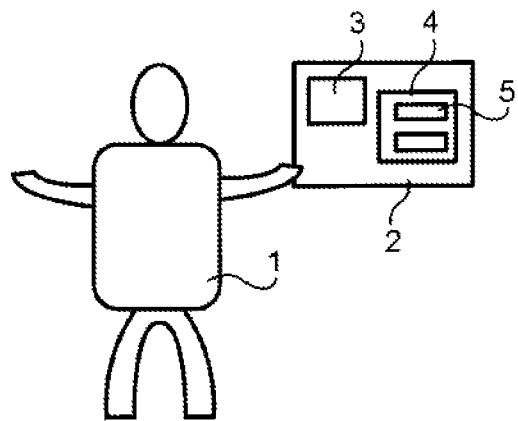
FIG. 1 is a diagram showing a user of the method of the invention.
Figure 2:
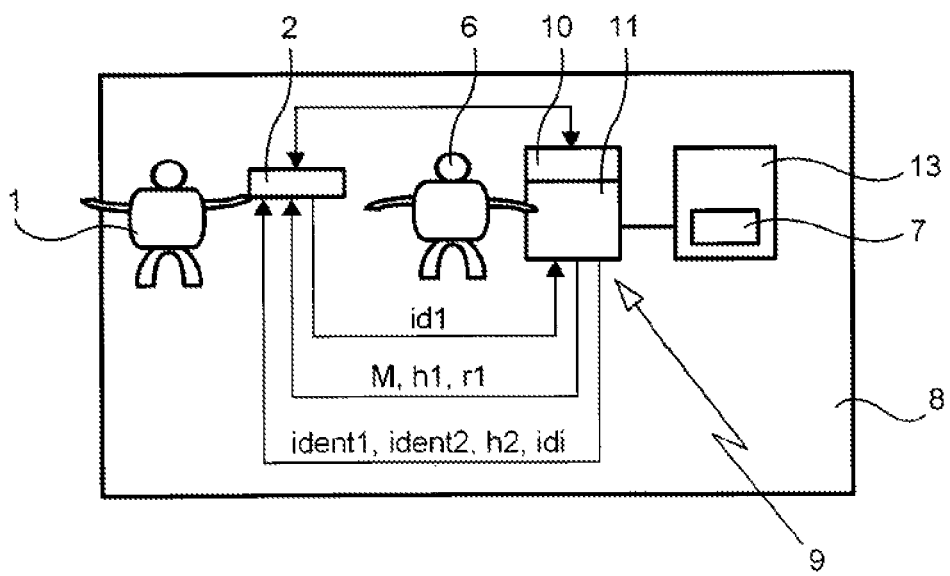
FIG. 2 is a diagram showing certain steps of the method of the invention.

With reference to FIGS. 1 and 2, there follows a description of the method of the invention applied to an individual 1, specifically a user 1 of the Social Security system in France, who needs to be able to access various services made available by Social Security, e.g. reimbursement of a medical expense. The user 1 has an identification medium, specifically a national identity card 2 having first processor means 3 and memory means 4 storing digital biometric data 5 of the user. The digital biometric data 5 in this example is representative of two of the user's fingerprints, and it was acquired and then stored in the identity card 2 when it was issued to the user 1. It is thus possible, during any verification (police check, etc.), to verify the identity of the user in very reliable manner, by acquiring the user's fingerprints and comparing them with the biometric data 5 stored in the identity card 2.

In addition to its prime function of providing identification, the identity card 2 is used to enable the user 1 to benefit from Social Security services, which requires the user 1 personally, or else a Social Security operative 6 (e.g. a civil servant), to have access to personal data 7 of the user, the personal data 7 including for example identification data, data concerning previous medical procedures, data relating to particular reimbursement conditions, etc. When the user 1 visits Social Security premises 8, the biometric data 5 corresponding to the user's fingerprints is acquired and then compared with the data stored in the memory means 4 of the identity card 2. By way of example, the premises 8 may include a reception terminal 9 having biometric acquisition means 10 enabling the user's fingerprints to be compared with the biometric data 5 in the identity card 2. This acquisition and this comparison make it possible to verify that the user 1 who is present is indeed the legitimate bearer of the identity card 2, thus making it possible to identify the user 1 in certain and reliable manner. It is specified at this point that the biometric acquisition means 10 are completely independent of other means of the reception terminal 9 and they do not transmit any data to Social Security.

The method of the invention begins with a step during which the first processor means 3 of the identity card 2 generate a first identifier id1 from the biometric data 5 of the user 1 and from at least one derivation parameter as supplied by Social Security, and they transmit this first identifier id1 to Social Security.

Specifically, the reception terminal 9 in the premises 8 includes is or connected to second processor means 11. The second processor means 11 transmit to the identity card 2: a first derivation parameter h1; a randomly defined second derivation parameter r1; and a third derivation parameter or modulus M. h1, r1, and M in this example are positive integers. The first processor means 3 of the identity card 2 then generates the first identifier id1, which is obtained using a trapdoor function. The term "trapdoor function" is used to designate a function that is relatively easy to calculate, but difficult in practice to invert. Specifically, the first identifier id1 in this example is obtained by modular exponentiation. The first processor means define the first identifier id1 as being equal to $h1^{db \cdot r1}$ mod M, where db is a numerical value representative of the individual's biometric data. The purpose of this operation is to encrypt the biometric data, this encryption of the biometric data naturally being more effective with increasing size of the integers h1 and r1.

The encrypted first identifier id1 is then transmitted to the second processor means 11. Only this first identifier id1 is transmitted by the identity card 2 to Social Security, so Social Security has no access to the biometric data 5 of the user 1.

The method of the invention then includes a step during which the second processor means 11 generate a serial number ns associated with the individual, followed by a step during which the second processor means 11 generate a digital key cln enabling them to recover the first, second, and third derivation parameters.

Thereafter, the method of the invention includes a step during which first check data ctrl1 is generated that contains the result of a consistency check calculation (e.g. of the parity check, cross-redundancy check, etc., type) serving to verify consistency between the first identifier id1, the serial number ns, and the digital key cln.

Thereafter, the method of the invention includes a step during which a first derived identity ident1 of the individual is generated. This first derived identity ident1 in this example is the result of concatenating a first data field containing the serial number ns, a second data field containing the first identifier id1, a third data field containing the digital key cln, and a fourth data field containing the first check data ctrl1.

The first derived identity is thus presented in the following form:

$$ident1 = ns \| id1 \| cln \| ctrl1$$

where the symbol "∥" is used herein to mean "concatenated with".

The first derived identity ident1 is presented in the form of a succession of bits, with the number of bits naturally corresponding to the size of the data in each of the fields. The order in which the fields are arranged is naturally given purely by way of example.

The first derived identity ident1 is associated by Social Security with the personal data 7 of the individual 1. Thus, Social Security has storage means 13 suitable for co-operating with the second processor means 11 and storing the personal data of all of the users of Social Security, and in particular the personal data 7 of the user.

Just like the requirements for security and encryption reliability, the total number of bits that may be stored by the memory means 4 of the identity card 2 for Social Security service (given that the card might possibly be used in the same way by other services) may be a determining element in dimensioning both id1 and ident1. By way of example, provision may be made to use six bits for the first identifier id1, six bits for the serial number ns, six bits for the digital key cln, and four bits for the check data ctrl1.

Advantageously, the method of the invention includes a step during which the second processor means 11 generate a second identifier trunc(id1), where this second identifier trunc(id1) is the result of an operation seeking to reduce the size of the fields making up the first identifier id1, and a step during which the second processor means 11 generate second check data ctrl2 for verifying consistency between the second identifier trunc(id1), the serial number ns, and the digital key cln. A second derived identity ident2 is then constituted by concatenating the serial number ns, the second identifier trunc(id1), the key cln, and the second check data ctrl2. The second derived identity ident2 thus has the following form:

$$ident2 = ns \| trunc(id1) \| cln \| ctrl2$$

The purpose of the second derived identity is described below.

This second derived identity ident2 is supplied to the user 1.

In addition to the second derived identity ident2, the second processor means 11 transmits to the individual a fourth derivation parameter h2 such that $h2 = g2^{s2}$, where g2 is a fifth derivation parameter and s2 is a "private" sixth derivation parameter known to and stored by Social Security. The first processor means 3 of the identity card 2 then perform a modular exponentiation calculation so as to define a static identity idi such that $idi = h2^{ident1}$ mod M', where M' is a modulus for a purpose that is described below.

This static identity idi is stored in the memory means 3 of the identity card 2.

Once the identity card 2 has been activated, at least with respect to its function associated with accessing Social Security services, the user 1 can obtain real access.

In the description below, a distinction is made between two kinds of access: access referred to as "manual access" during which the user accesses the desired service with the help of the Social Security operator 6, and access referred to as "remote access" during which the user accesses the service remotely using remote communication means of the Internet or telephone network type.

Figure 3:
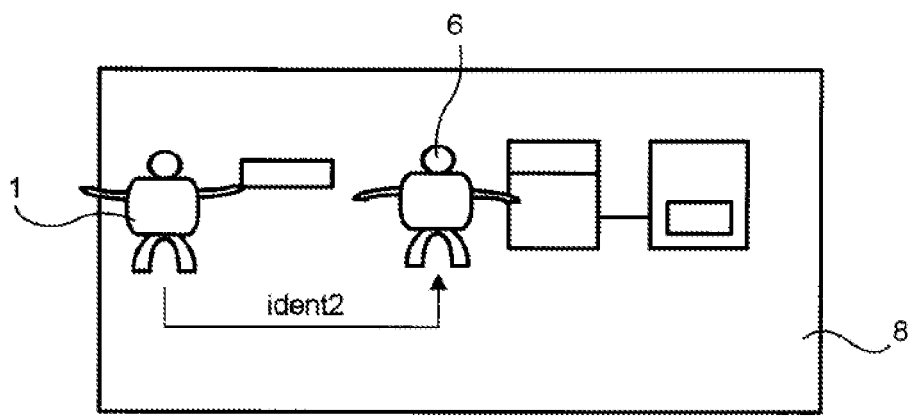
FIGS. 3 and 4 are diagrams showing respectively manual access and remote access to the personal data of the individual, while implementing the method of the invention.

During manual access, as shown in FIG. 3, the user visits Social Security premises 8 and provides the Social Security operator 6 with the second derived identity ident2. The operator 6 then manually inputs the second derived identity ident2 into interface means, e.g. the reception terminal 9, suitable for co-operating with Social Security's second processor means 11. By using the second derived identity ident2, the second processor means 11 recover the first derived identity ident1, which identity is associated with the individual's personal data 7. The personal data 7 can then be recovered from the storage means 13, and used by Social Security or by the user while the user 1 is engaged in manual access.

Figure 4:
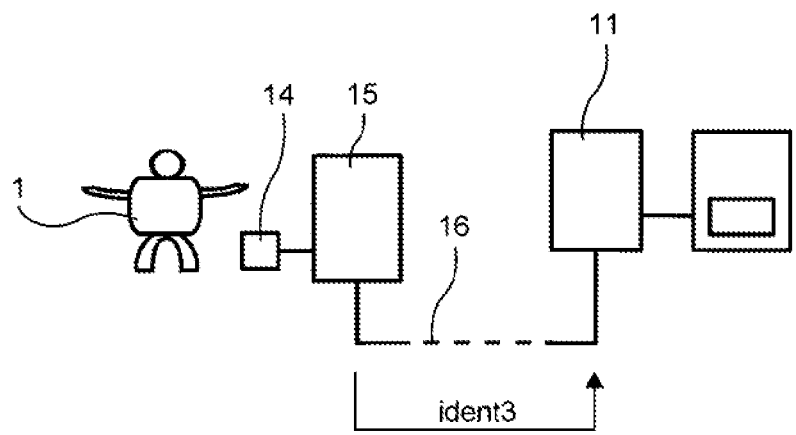

During remote access by a user 1, as shown in FIG. 4, where the user may for example be connected to the Social Security Internet site, the biometric data corresponding to the fingerprints of the user 1 is acquired and then compared with the data stored in the memory means of the identity card. This acquisition and this comparison are performed by biometric acquisition means 14 held by the user 1, e.g. of the universal serial bus (USB) biometric reader type connected to a piece of equipment 15 (a computer, etc.) belonging to the user and connected to the Internet 16. If the comparison is successful, the identity card 2 defines a random seventh derivation parameter r2 that is characteristic of the present remote access. The identity card 2 also receives from Social Security an eighth derivation parameter c that depends on the transaction and/or the service provided by Social Security at the time of the transaction. Thereafter, the identity card calculates a third derived identity or dynamic identity ident3 formed by a first identification term of the form $a=g2^{r2}$ and by a second identification term of the form $b=h2^{(r2+c) \cdot ident1}=idi^{r2+c}$. The third derived identity ident3 is recalculated on each remote access by the user. This dynamic third identity ident3 is transmitted via the Internet 16 to Social Security and to the second processor means 11. This third dynamic identity ident3 is taken directly from the static identity idi and thus from the first derived identity ident1. In order to verify the integrity of the third derived identity ident3, the second processor means 11 verify that $(a \cdot g2^c)^{s2 \cdot ident1}=b$. By using this third derived identity ident3, the second processor means 11 recover the first derived identity ident1 that is associated with the personal data 7 of the individual 1. This personal data 7 can thus be used by Social Security during access by the user 1, and it may possibly be transmitted to the user 1 personally.

Thus, both for manual access and for remote access, a manual or derived identity is generated from the first derived identity ident1, either by Social Security (as for ident2), or by the card itself (as for ident3). These derived identities give access to the personal data 7 of the individual 1 without using any information specific to the real identity of the user 1 or to the user's biometric data 5.

As a result, only the user 1, with the help of the identity card 2, is in a position to access the user's personal data 7 or to allow Social Security's processor means or an operator 6 to access that personal data, with it not being possible for the processor means or the operator 6 to identify the user from this personal data.

It may also be assumed that the State of France possesses biometric files with reliable links to the identities of individuals. In the event of a problem (e.g. suspected fraud or identity theft), Social Security can verify whether the individual who has access to the data is indeed the authorized individual.

The invention is not limited to the particular implementation described above, but on the contrary covers any variant coming within the ambit of the invention as defined by the claims.

Although the description makes use of the identity card as the document appropriate for co-operating with Social Security, it would naturally be possible to use some other identification medium, such as an electronic terminal, a mobile telephone, a passport, . . . , providing it contains biometric data of the individual.

Although the description refers to Social Security as being the sole service supplier with which the identity card is adapted to co-operate, it is naturally possible to make provision for the card to be capable of giving access to services from other suppliers.

Although it is stated that the first derived identity is the result of concatenating a first data field containing the serial number, a second data field containing the first identifier, a third data field containing the digital key, and a fourth data field containing the first check data, the first derived identity could perfectly well be formed by using not all of these data fields, but only some of these data fields.

The invention claimed is:

1. A method of generating at least one derived identity of an individual (1) to be used by a service supplier, the method comprising the following steps:
    generating a first identifier (id1) from biometric data (5) of the individual using a user device;
    defining a serial number (ns) associated with the individual by a service supplier device;
    generating first check data (ctrl1) by the service supplier device for verifying consistency between the first identifier (id1) and the serial number (ns);
    concatenating the serial number (ns), the first identifier (id1), and the first check data (ctrl1) by the service supplier device in such a manner as to form a first derived identity (ident1) of the individual; and
    storing the first derived identity in the user device, wherein
    when the individual gains access to a service of the service supplier using the first derived identity stored in the user device, it is not possible to identify the individual from data of the individual stored in the service supplier device.

2. A method according to claim 1, wherein the first identifier is generated from at least one derivation parameter.

3. A method according to claim 2, further including a step consisting in defining a digital key (cln) serving to recover the derivation parameter, the first derived identity being formed by concatenating the serial number (ns), the first identifier (id1), first check data (ctrl1), and the digital key (cln).

4. A method according to claim 1, wherein the first identifier (id1) is obtained from a trapdoor function.

5. A method according to claim 3, wherein the first identifier is the result of modular exponentiation of the type $h1^{db \cdot r1}$ mod M, where h1 is a first derivation parameter, r1 is a randomly defined second derivation parameter, M is a third derivation parameter or modulus, dB is a digital value representative of the user's biometric data (5), and wherein the digital key (cln) enables the first, second, and third parameters to be recovered.

6. A method according claim 3, further including the following steps:
    generating a second identifier (trunc(id1)) obtained by reducing the size of the first identifier (id1);
    generating second check data (ctrl2) for verifying consistency between the second identifier, the serial number, and the digital key; and
    concatenating the serial number, the second identifier, the digital key, and the second check data so as to constitute a second derived identity (ident2) of the individual.

7. A method according to claim 6, wherein the second derived identity (ident2) is for manually accessing personal data of the user stored by a service supplier.

8. A method according to claim 7, further including a step consisting in generating a static identity (idi) of the form $h2^{ident1}$ mod M', where ident1 is the first derived identity, h2 is a fourth derivation parameter, and M' is a modulus.

9. A method according to claim 1, further including the step of generating a third derived identity (ident3) or dynamic derived identity, the dynamic derived identity being formed by a first identification term of the form $a=g2^{r2}$ and by a second identification term of the form $b=h2^{(r2+c) \cdot ident1}$, with $g2^{s2}=h2$, ident1 being the first derived identity, h2 being the fourth derivation parameter, g2 and s2 being the fifth and sixth derivation parameters, r2 being a random seventh derivation parameter, and c being an eighth derivation parameter.

10. A method according to claim 9, further including a step during which it is verified that $(a.g2^c)^{s2.ident1}=b$.

11. A method according to claim 9, wherein the third derived identity is for remotely accessing the personal data of the user stored by the service supplier, and wherein the third derived identity (ident3) is recalculated on each user access to the user's personal data.

12. A method according to claim 1, wherein the first identifier (id1) and/or the third derived identity (ident3) and/or the static identity (idi) is/are generated by an identification medium (2) held by the individual and containing biometric data of the individual.

13. A method according to claim 12, wherein the first identifier (id1) and/or the third derived identity (ident3) and/or the static identity (idi) is/are stored in the identification medium.

14. A method according to claim 12, further including a step during which the identity of the user is verified by acquiring biometric data of the user and comparing it with the biometric data stored in the identification medium.

* * * * *